US009305545B2

(12) United States Patent
Cheung

(10) Patent No.: US 9,305,545 B2
(45) Date of Patent: Apr. 5, 2016

(54) SPEECH RECOGNITION VOCABULARY INTEGRATION FOR CLASSIFYING WORDS TO IDENTIFY VOCABULARY APPLICATION GROUP

(71) Applicant: SAMSUNG ELECTRONICS CO., LTD., Suwon, Gyeonggi-Do (KR)

(72) Inventor: Chun Shing Cheung, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 13/802,390

(22) Filed: Mar. 13, 2013

(65) Prior Publication Data

US 2014/0278411 A1     Sep. 18, 2014

(51) Int. Cl.
*G10L 15/18* (2013.01)
*G10L 15/20* (2006.01)

(52) U.S. Cl.
CPC ........ *G10L 15/18* (2013.01); *G10L 15/20* (2013.01)

(58) Field of Classification Search
USPC ................................................. 704/240, 235
See application file for complete search history.

(56) References Cited

U.S. PATENT DOCUMENTS

| 7,133,827 | B1* | 11/2006 | Gillick et al. ................. 704/243 |
| 7,308,404 | B2 | 12/2007 | Venkataraman et al. |
| 2005/0055210 | A1* | 3/2005 | Venkataraman et al. ..... 704/255 |
| 2008/0033720 | A1* | 2/2008 | Kankar et al. ................ 704/235 |
| 2012/0059658 | A1* | 3/2012 | Sejnoha .................. G10L 15/26 704/270 |
| 2013/0289988 | A1* | 10/2013 | Fry .............................. 704/239 |
| 2014/0019126 | A1* | 1/2014 | Abrams et al. ................ 704/235 |
| 2014/0067371 | A1* | 3/2014 | Liensberger ...................... 704/9 |

* cited by examiner

*Primary Examiner* — Qian Yang
(74) *Attorney, Agent, or Firm* — Sherman IP LLP; Kenneth L. Sherman; Steven Laut

(57) ABSTRACT

A method for vocabulary integration of speech recognition comprises converting multiple speech signals into multiple words using a processor, applying confidence scores to the multiple words, classifying the multiple words into a plurality of classifications based on classification criteria and the confidence score for each word, determining if one or more of the multiple words are unrecognized based on the plurality of classifications, classifying each unrecognized word and detecting a match for the unrecognized word based on additional classification criteria, and upon detecting a match for an unrecognized word, converting at least a portion of the multiple speech signals corresponding to the unrecognized word into words.

30 Claims, 8 Drawing Sheets

SPEECH RECOGNITION VOCABULARY INTEGRATION FOR CLASSIFYING WORDS TO IDENTIFY VOCABULARY APPLICATION GROUP

TECHNICAL FIELD

One or more embodiments relate generally to speech recognition, and in particular to integration of third-party vocabularies with speech recognition.

BACKGROUND

Automatic Speech Recognition (ASR) is used to convert uttered speech to a sequence of words. ASR is used for user purposes, such as dictation. Typical ASR systems convert speech to words in a single pass with a generic set of vocabulary (words that the ASR engine can recognize).

SUMMARY

In one embodiment, a method provides for vocabulary integration of speech recognition. One embodiment comprises a method that comprises converting a plurality of speech signals into a plurality of words using a processor and applying a plurality of confidence scores to the plurality of words. In one embodiment, the plurality of words are classified into a plurality of classifications using classification criteria and the confidence score for each one of the plurality of words. In one embodiment, it is determined if one or more words are unrecognized based on the plurality of classifications. Each unrecognized word is classified for detecting a match for the unrecognized word based on additional classification criteria. In one embodiment, upon detecting a match for an unrecognized word, at least a portion of the plurality of speech signals corresponding to the unrecognized word are converted to a plurality of recognized words.

One embodiment provides a system for vocabulary integration of speech recognition. In one embodiment an electronic device includes a microphone for receiving a plurality of speech signals and an automatic speech recognition (ASR) engine that converts the plurality of speech signals into a plurality of words. In one embodiment, the ASR engine comprises a vocabulary application interface for integrating vocabulary applications. In one embodiment unrecognized words resulting from a first speech recognition pass using the ASR engine are converted into recognized words using the ASR engine for a second speech recognition pass for providing a recognized speech result.

Another embodiment provides non-transitory computer-readable medium having instructions which when executed on a computer perform a method comprising: performing a first speech recognition process for converting speech signals into a plurality of words. In one embodiment the plurality of words are classified based on using a confidence score for each one of the plurality of words and classification criteria. In one embodiment, upon determining that one or more words are unrecognized based on the classifying, additional classification criteria are received. In one embodiment, the one or more unrecognized words are classified based on using a plurality of confidence scores for each unrecognized word and the additional classification criteria. In one embodiment, upon determining a match for the one or more unrecognized words, a second speech recognition process is performed for converting at least a portion of the plurality of speech signals to a plurality of recognized words using.

These and other aspects and advantages of will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

Figure 1:
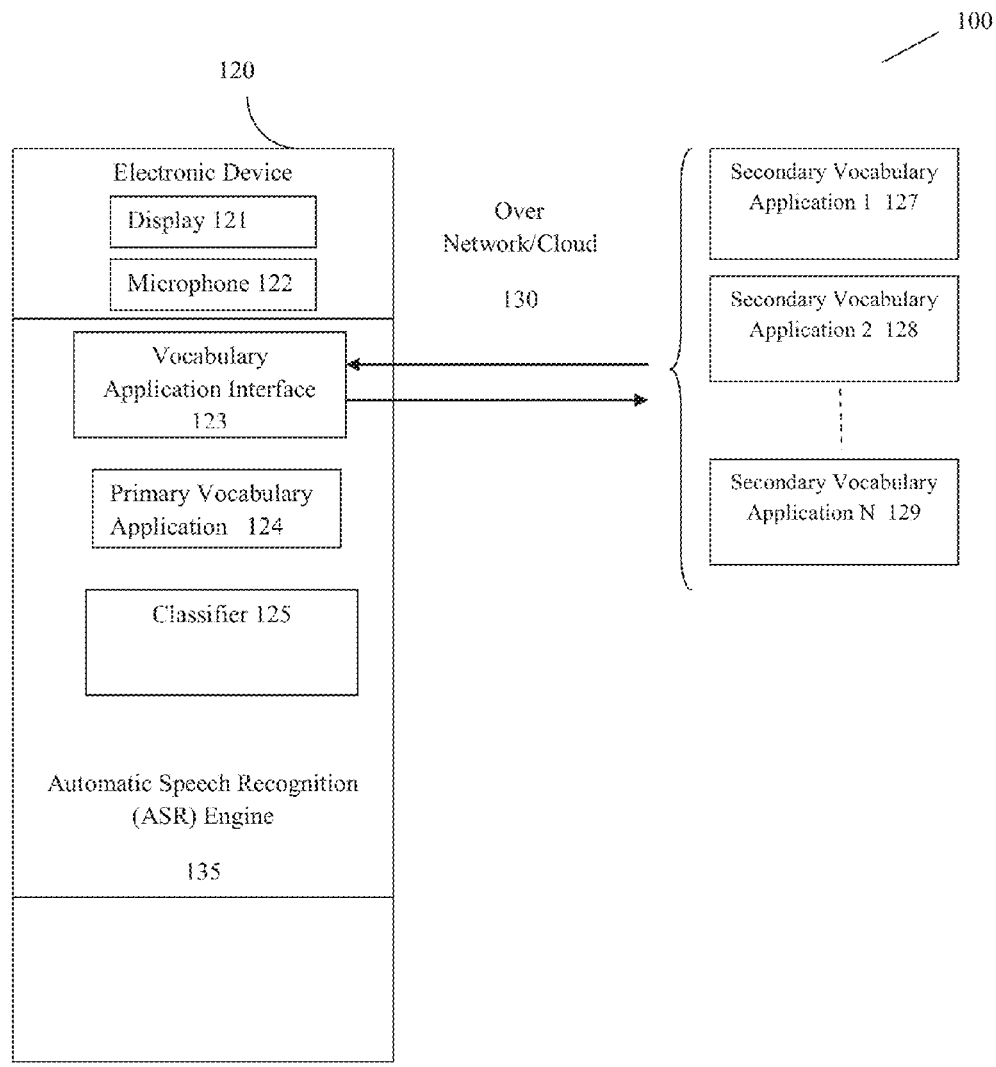
FIG. 1 shows a block diagram of an architecture system for voice recognition vocabulary application integration for an electronic device, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to voice recognition using primary (e.g., generic) and secondary (e.g., third-party) vocabulary applications. In one embodiment, voice recognition vocabulary application integration is provided for third-party vocabulary applications for an electronic device.

In one embodiment, the electronic devices comprise one or more stationary or mobile electronic devices capable of data communication over a communication link such as a wireless communication link. Examples of such mobile device include a mobile phone device, a mobile tablet device, etc. Examples of stationary devices include televisions, projector systems, etc. In one embodiment, a method provides for speech recognition vocabulary integration for electronic devices. One embodiment comprises a method that comprises converting a plurality of speech signals into words and applying a plurality of confidence scores to the plurality of words. In one embodiment, the plurality of words are classified based on classification criteria and the confidence score for each one of the plurality of words. In one embodiment, it is determined if one or more words are unrecognized based on the classification, and additional classification criteria is provided for the one or more unrecognized words. The one or more unrecognized words are classified for determining a match based on the additional classification criteria. In one embodiment, upon determining a match for the one or more unrecognized words, at least a portion of the plurality of speech signals are converted to a plurality of recognized words. In one embodiment, a primary vocabulary application is used for converting the plurality of speech signals into the plurality of words and the additional classification criteria is provided for one or more secondary vocabulary applications for the unrecognized words.

In one embodiment, examples of secondary (e.g., third-party) vocabulary applications may comprise special vocabularies (e.g., a list(s) of targeted understandable words, pseudo-words, made-up words, etc.), such as vocabularies of phonebooks for voice-over-Internet protocol (IP) (VoIP) applications, contact lists for messaging applications, made-up words for movie titles, foods, topics, social networks, marketing terms for vendor applications, slang, and other application-specific terms. Third-party special vocabularies may be very dynamic and costly to produce. In one embodiment, the vocabularies are not only application-dependent but also user-dependent. The phonebooks and contact lists for VoIP and messaging applications may be different for each user and may be updated at any time, especially if the lists are stored on a cloud environment and may be updated using different devices. Movies are constantly produced, and the list of made-up words for movies needs to be updated often to provide the most up-to-date voice recognition results. Getting the list of special vocabulary for an application may take a long time and may involve a lot of network traffic, such as accessing a cloud may be required.

One embodiment efficiently integrates application-specific vocabularies into an automatic speech recognition (ASR) engine (e.g., ASR engine 135, FIG. 1). In one embodiment, to avoid the overhead of obtaining all possible vocabularies from all applications, only a generic set of vocabulary (e.g., from a primary vocabulary application) is used for the initial speech recognition process on the ASR engine 135. In one embodiment, with the initial speech recognition result, classification is performed to classify the speech in one or more secondary (e.g., third-party) vocabulary applications. In one embodiment, the third-party applications generate specific vocabularies and pass them to the ASR engine 135 to repeat the speech recognition (e.g., a second speech recognition process) with the additional vocabularies. In one embodiment, third-party application-specific vocabularies are dynamically maintained, and therefore, up-to-date as they are obtained at a requested time for speech recognition. In one embodiment, overhead is reduced since not all of the third-party vocabularies from all applications need to be obtained, and only those vocabulary applications classified to possibly match the unrecognized speech are requested for specific vocabularies. In one embodiment, third-party vocabulary applications may be provided with the recognition results that use their specific vocabularies for better natural language understanding and services.

FIG. 1 shows a functional block diagram of an embodiment of an architecture system 100 for speech recognition integration of vocabulary applications for an electronic device 120, according to an embodiment. In one embodiment, the electronic device 120 comprises a display 121, a microphone 122, and an ASR engine 135. In one embodiment, secondary vocabulary application 1 127, secondary vocabulary application 2 128 to secondary vocabulary application N 129 are provided by third-party providers and may be obtained from the cloud or network 130, where N is a positive integer equal to or greater than three.

In one embodiment, the display 121 may be a separate device from the electronic device 120 or integrated with the electronic device 120. In one embodiment, the microphone 122 may be a separate device from the electronic device 120 or integrated with the electronic device 120.

In one embodiment, the electronic device 120 may comprise a mobile device that may utilize mobile device hardware functionality including: a display 121, a global positioning satellite (GPS) receiver module, a compass module, and an accelerometer and gyroscope module. The GPS module is used to identify a current location of the mobile device (i.e., user). The compass module is used to identify direction of the mobile device. The accelerometer and gyroscope module is used to identify tilt of the mobile device. In other embodiments, the electronic device may comprise a television or television component system.

In one embodiment, the ASR engine 135 comprises a vocabulary application interface 123, a primary (e.g., generic) vocabulary application 124 that may be stored in local memory, and a classifier 125. In one embodiment, the primary vocabulary application is used for an initial speech recognition process performed by the ASR 135. In one embodiment, the ASR 135 initially converts speech signals entered through the microphone 122 into words based on the primary vocabulary application 124 for a first or initial speech recognition pass or process. In one embodiment, the words of the recognition result are assigned a confidence score that specifies a probability that the words that were converted actually represent the intended terms of the speech.

In one embodiment, the classifier 125 statistically classifies the words based on using the confidence score for each word and on classification criteria of the primary vocabulary application 124 in order to identify whether the words belong to a class or group. For a second speech recognition process using secondary vocabulary applications (e.g., the secondary vocabulary application 1 127, the secondary vocabulary application 2 128 to the secondary vocabulary application N 129), the classifier 125 classifies unrecognized words based on using a confidence score for each unrecognized word and on classification criteria of the secondary vocabulary application.

In one embodiment, the classifier may employ different processing means for classifying the words, such as using a Bayesian process, binary classification, use of feature vectors, linear classification, non-linear classification, etc. In one embodiment, based on confidence scores, the classifier 125 determines whether the converted words are known or unknown based on the primary vocabulary application 124 classification criteria or secondary vocabulary applications (e.g., the secondary vocabulary application 1 127, the secondary vocabulary application 2 128 to the secondary vocabulary application N 129) classification criteria.

Figure 2:
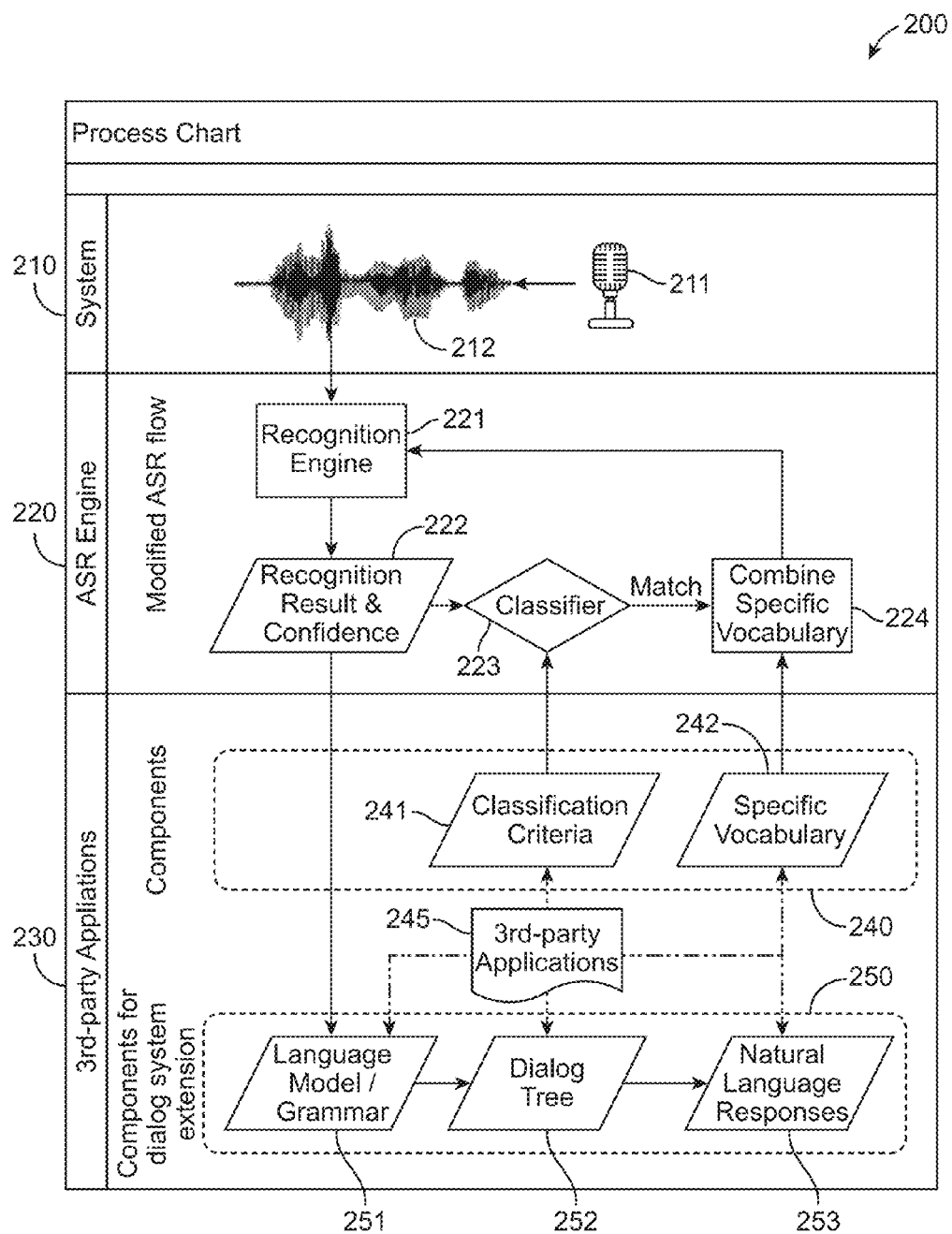
FIG. 2 shows an example flow chart for voice recognition vocabulary application integration for an electronic device, according to an embodiment.

FIG. 2 shows an example flow chart process 200 for speech recognition integration of vocabulary applications (e.g., third-party) for an electronic device (e.g., electronic device 120), according to an embodiment. In one embodiment, the process 200 is segmented into a system level portion 210, an ASR engine (e.g., via ASR engine 135) portion 220, and a third-party applications portion 230. In one embodiment, the process 200 starts with block 210 where a speech is entered into a microphone 211 and converted into speech signals 212.

In one embodiment, the speech signals 212 enter into the recognition engine in block 221 and are converted into words. Process 200 continues to block 222 where the recognized words are given a confidence score based on a probability that the converted words are accurate (e.g., compared to known words based on resulting spelling, etc.). Process 200 continues to block 223 where the resulting words and assigned confidence scores are classified initially using classifier criteria from the primary vocabulary application from block 241. If the classifier 223 determines there is a match based on the primary vocabulary application classifier criteria, process 200 uses the results for services, such as for a dialog system 250 that may use the results to communicate back and forth with a user, accept language for a service (e.g., reservations, buying a product, entering information, etc.).

If block 223 determines that there is not a match to words from the initial speech recognition pass, process 200 continues by requesting classifier criteria 241 from third-party applications 245. Process 200 continues with obtaining specific vocabulary 240 from third-party applications 241 (e.g., from the cloud/network 130) and obtaining the classification criteria 241 from the third-party applications 245 (e.g., from the cloud/network 130). Process 200 continues to block 224 where the obtained specific vocabulary 240 may be combined with other obtained vocabulary (e.g., the generic vocabulary from the primary vocabulary application 124). The recognition engine 221 passes the words and combined vocabulary to the recognition result and confidence block 222 to determine assigned confidence scores for the words.

Process 200 continues with block 223 where the resulting words and assigned confidence scores are classified secondarily using classifier criteria from the secondary vocabulary applications obtained from the third-party applications 245 from block 241. If the classifier 223 determines there is a match based on the secondary vocabulary application classifier criteria, process 200 then outputs the results. If a match is not found, and further third-party applications 245 are available for specific vocabulary 242, the process 200 continues to repeat until there is a match, or until no further third-party vocabulary applications 245 are available.

In one embodiment, the results may be used for services, such as for a dialog system 250 that may use the results to communicate back and forth with a user, accept language for a service (e.g., reservations, buying a product, entering information, etc.), etc. In one embodiment, the dialog system 250 uses a language and grammar model 251, a dialog tree 252, and natural language responses 253 for performing two-way dialog with one or more speech recognition (e.g., from an ASR engine, such as ASR engine 135).

Figure 3:
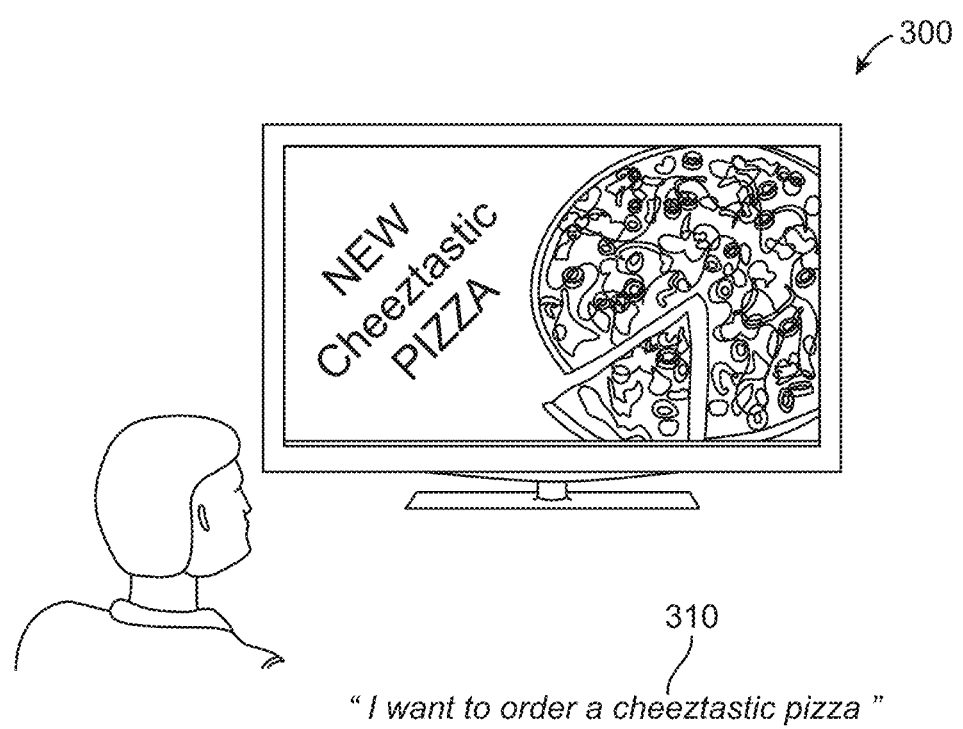
FIG. 3 shows an example scenario for voice recognition vocabulary application integration for an electronic device, according to an embodiment.

FIG. 3 shows an example scenario 300 for voice recognition vocabulary application integration for an electronic device (e.g., electronic device 120, FIG. 1), according to an embodiment. In one embodiment, a user may see an advertisement for a new product, such as an advertisement by a pizza provider. The user may then use an electronic device 120 (FIG. 1) to enter example speech 310 as "I want to order a Cheeztastic pizza" using the microphone 122 and ASR engine 135. In the example scenario 300, the term "Cheeztastic" pizza is a made-up word by a provider of the pizza (e.g., a pizza chain company that delivers pizza locally).

Figure 4:
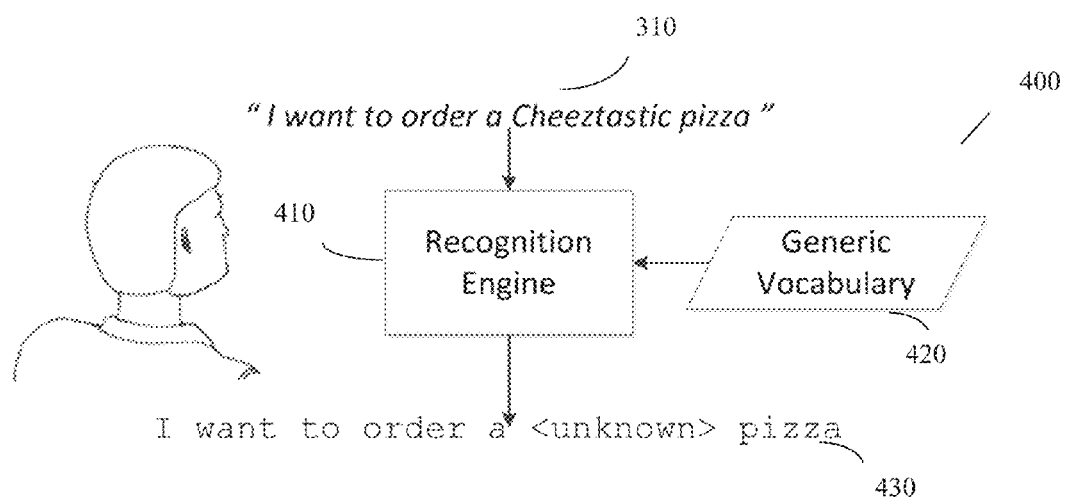
FIG. 4 shows a flow chart example scenario for voice recognition vocabulary application integration for an electronic device, according to an embodiment.

FIG. 4 shows a flow chart example scenario 400 for voice recognition vocabulary application integration for an electronic device (e.g., electronic device 120, FIG. 1), according to an embodiment. In one embodiment, the speech 310 with the made-up term "Cheeztastic" converted into words by the ASR engine 135 as input to the recognition block 410 using a primary vocabulary application 124 that uses generic vocabulary 420. Since the generic vocabulary 420 does not include the unrecognized term "Cheeztastic," the converted word results 430 output <unknown> for the unrecognized term in the output of "I want to order a <unknown> pizza." In one embodiment, since the generic vocabulary 420 of the primary vocabulary application 124 cannot convert the unrecognized term "Cheeztastic," secondary vocabulary applications (e.g., secondary vocabulary application 1 127, secondary vocabulary application 2 128 to secondary vocabulary application N 129) are requested (e.g., over the cloud/network 130) in order to attempt to recognize the term "Cheeztastic."

Figure 5:
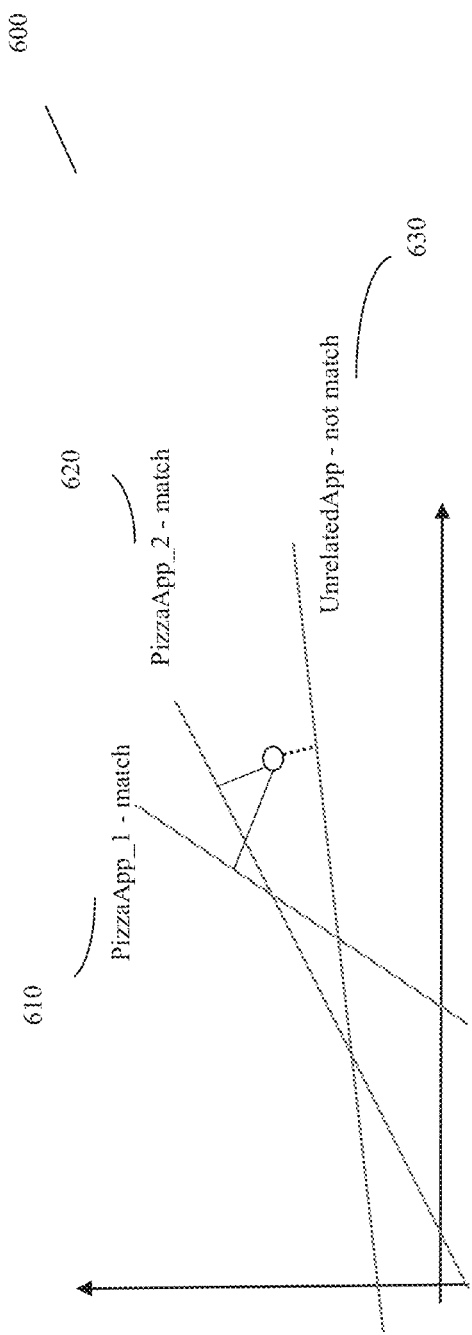
FIG. 5 shows an example of linear classification for voice recognition vocabulary application integration for an electronic device, according to an embodiment.

FIG. 5 shows an example of linear classification 600 for voice recognition vocabulary application integration for an electronic device (e.g., electronic device 120, FIG. 1), according to an embodiment. In one embodiment, an unrelated vocabulary application UnrelatedApp 630 supplied classifiers do not result in a match. In one embodiment, a secondary vocabulary application, such as a pizza vocabulary application PizzaApp_1 610 supplied classifiers that result in a possible match for an unrecognized term (e.g., "Cheeztastic"). In one embodiment, a secondary vocabulary application, such as a pizza vocabulary application PizzaApp_2 620 supplied classifiers that result in a possible match for an unrecognized term (e.g., "Cheeztastic"). In one embodiment, the distance of the lines to the graphical representation of the unrecognized term dictates the linear classification 600.

Figure 6:
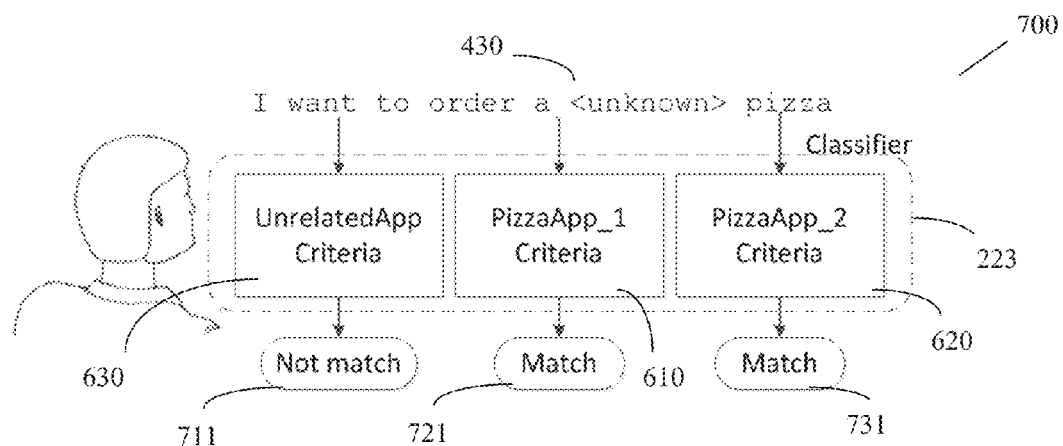
FIG. 6 shows another example flow chart for classification for voice recognition vocabulary application integration for an electronic device, according to an embodiment.

FIG. 6 shows another example flow chart 700 for classification for voice recognition vocabulary application integration for an electronic device (e.g., electronic device 120), according to an embodiment. In one embodiment, the converted word results 430 output <unknown> for the unrecognized term in the output of "I want to order a <unknown> pizza" is used for classification by the classifier 223. In one embodiment, a primary vocabulary application UnrelatedApp 630 that is an unrelated vocabulary application to the subject of the converted word results 430, a secondary vocabulary application PizzaApp_1 610, and another secondary vocabulary application PizzaApp_2 620 have supplied classifier criteria to the classifier 223. In one example, the classifier returns a result 711 of no match for the UnrelatedApp 630, returns a result 721 of a match for the PizzaApp_1 610, and returns a result 731 of a match for the PizzaApp_2 620. In one embodiment, the two matching secondary applications do not have a high confidence (based on confidence scores) due to the unknown term in the speech. Therefore, in one example, additional vocabularies from the secondary application are requested (e.g., over the cloud/network 130). In one embodiment, the results 721 and 731 are used to process the converted word results 430 through the recognition engine 221 for another pass to attempt recognition using the requested vocabularies from the secondary vocabulary applications (e.g., PizzaApp_1 610 and PizzaApp_2 620).

Figure 7:
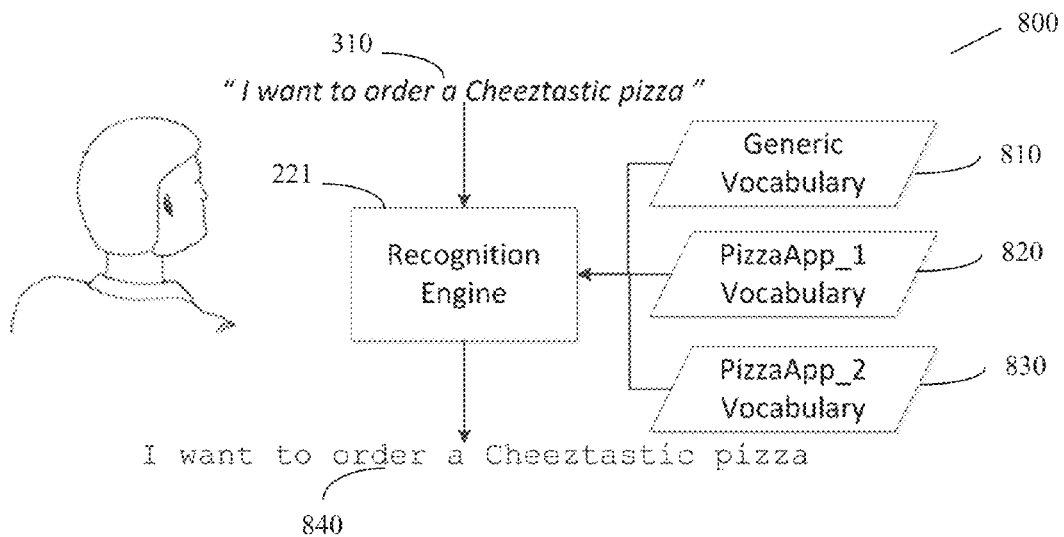
FIG. 7 shows an example flow chart for using a secondary vocabulary application for voice recognition vocabulary application integration for an electronic device, according to an embodiment.

FIG. 7 shows an example flow chart 800 for using a secondary vocabulary application for voice recognition vocabulary application integration for an electronic device (e.g., electronic device 120, FIG. 1), according to an embodiment. In one embodiment, the recognition engine 221 may or may not recognize the whole speech 212 all over again. In one embodiment, the recognition engine 221 may retain the recognition result from the initial recognition, and depending on the confidence scores on the words, may choose to recognize only parts of the speech with unknown words or with low confidence scores. In one embodiment, the recognition engine 221 may choose to use the words only from one or more of the specific vocabularies provided by the secondary vocabulary applications.

Figure 8:
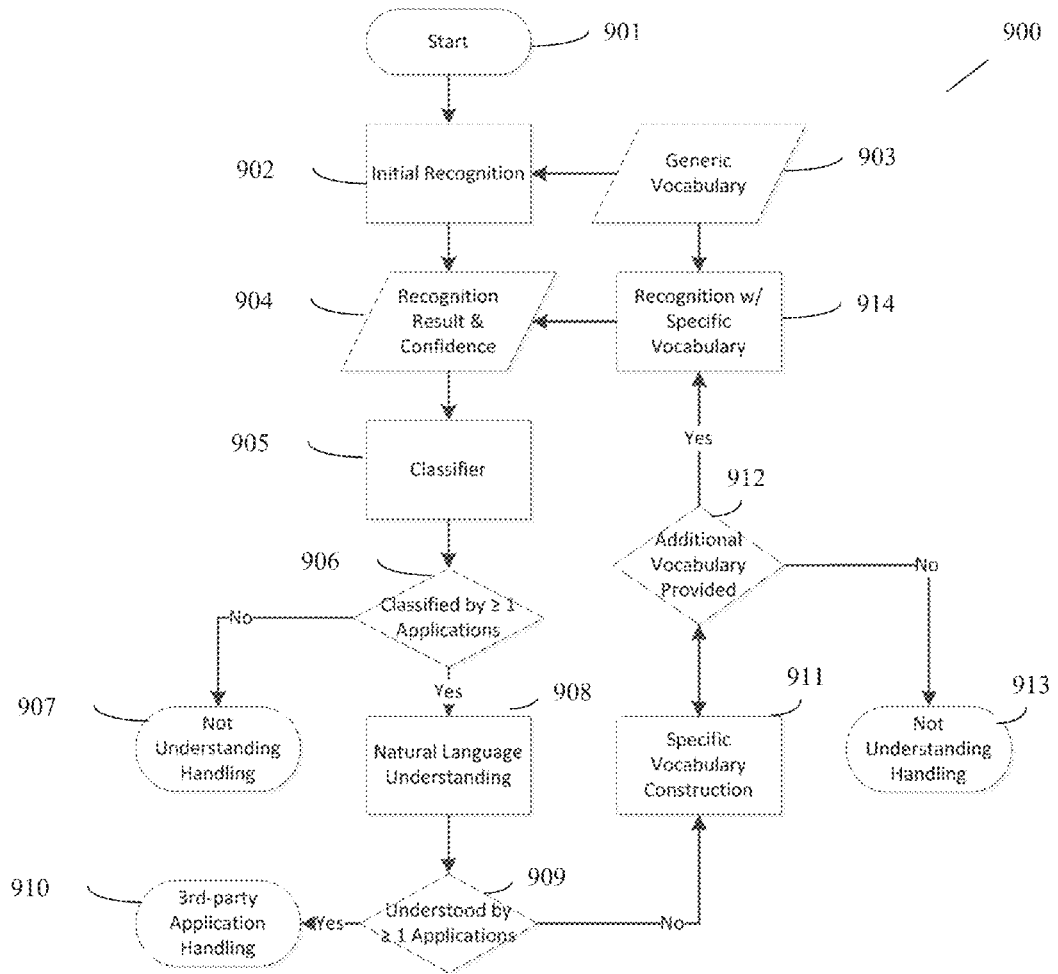
FIG. 8 shows an example flow chart for voice recognition vocabulary application integration for an electronic device, according to an embodiment.

In one example, using the match results from the classifier 223 for the secondary vocabulary applications PizzaApp_1 610 and PizzaApp_2 620, the example speech 310 of "I want to order a Cheeztastic pizza" is attempted to be recognized through the recognition engine 221 using vocabularies from the combination of primary vocabulary application (generic vocabulary 810) and secondary vocabulary applications (PizzaApp_1 610 vocabulary 820 and PizzaApp_2 620 vocabulary 830). In one example, the specific vocabulary 820 from the secondary vocabulary application PizzaApp_1 610 contains the word "Cheeztastic," hence the recognition engine 221 is able to recognize the word in the speech 310 and generate the complete recognition result 840 with high confidence. In one embodiment, the recognition result 840 is again processed through the classifier 223 and natural language understanding process 908 (FIG. 8). In one example, the secondary recognition processing results in the complete recognition result, the PizzaApp_1 610 application is confident that it may handle the user request, and the ASR engine 135 (FIG. 1) passes the control over to the third party handling the PizzaApp_1 application 610.

FIG. 8 shows an example flow chart 900 for voice recognition vocabulary application integration for an electronic device (e.g., electronic device 120, FIG. 1), according to an embodiment. In one embodiment, the process 900 starts with block 901 where the process 900 starts up. In one embodiment, the process 900 may begin by a user launching a voice recognition application on a mobile or stationary electronic device (e.g., electronic device 120) by, e.g., tapping on a display screen, pressing a button, using a remote control, etc. In one embodiment, speech signals entered through a microphone (e.g., microphone 211) are input into block 902 for an initial recognition (e.g., a first voice recognition process or pass) using a generic vocabulary (from a primary vocabulary application) input from block 903.

In one embodiment, in block 904, the result from block 902 are attempted to be recognized and confidence scores are assigned to the words. Process 900 continues with block 905 where the classifier performs a classification process on the output of block 904 using classifier criteria from the primary vocabulary application and the confidence scores assigned to the words according to one embodiment. In block 906, the results from the classifier block 905 are determined to be classified or not to primary vocabulary application. In one embodiment, if it is determined that the results are not classified, process 900 continues to block 907 for not understanding handling (e.g., a request to say the spoken request/words again, etc.).

In one embodiment, if it is determined that at least a portion of the words are classified by block 906, process 900 continues to block 908. In block 908, a natural language process is performed for analyzing the words as natural language (understood words) or not (e.g., unrecognized words, made-up words, etc.), according to one embodiment. Process 900 continues to block 909 where it is determined whether the output of block 908 is understood as natural words or not. In one embodiment, if all of the words are understood, then process 900 continues to block 910 where third-party vocabulary application(s) use the understood words as input for services, such as for dialog processes, ordering, making requests, etc.

In one embodiment, if it is determined that not all of the words are understood in block 909, the process 900 continues to block 911 where specific vocabulary construction is performed for requesting additional vocabularies from third-parties (e.g., secondary vocabulary applications). In block 912, if no other vocabularies are available from third-party vocabulary application providers (or other providers), process 900 continues to block 913 for no understanding handling (e.g., a request to say the spoken request/words again, etc.).

In one embodiment, if it is determined in block 912 that other secondary vocabulary application vocabularies are available from third-party providers (or other providers), requested vocabularies are received from providers (e.g., over the cloud/network 130 (FIG. 1)). In one embodiment, process 900 continues to block 914 where the additional specific secondary vocabularies are used with the generic vocabulary from block 903 for recognition. In one embodiment, the process continues back to block 904 and repeats until all of the words are recognized and understood, or no further vocabularies are available and one or more words are unrecognizable, where process 900 continues to block 907 or block 913.

Figure 9:
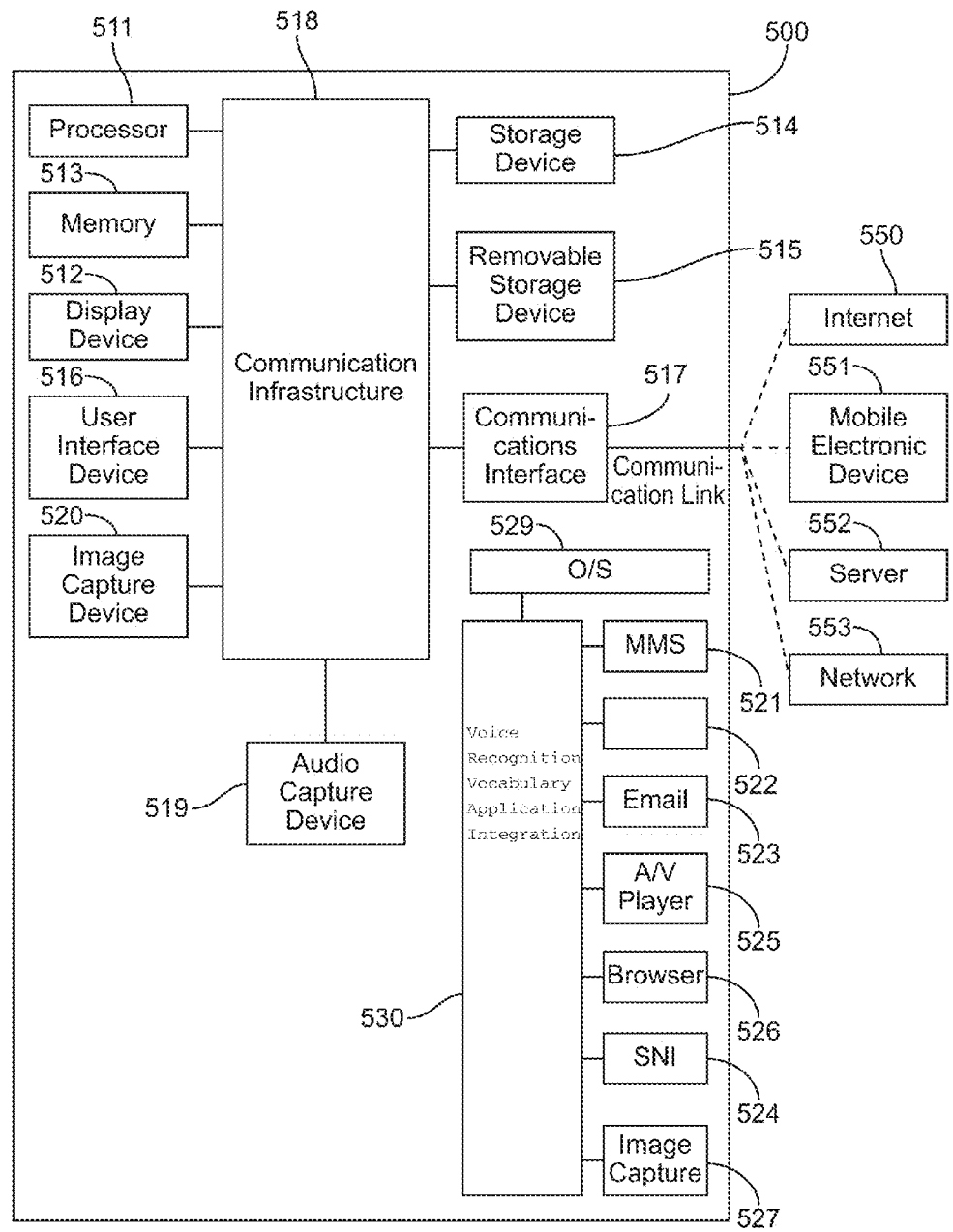
FIG. 9 is a high-level block diagram showing an information processing system comprising a computing system implementing an embodiment.

FIG. 9 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals to/from a plurality of sinks/sources, such as, the Internet 550, a mobile electronic device 551, a server 552, or a network 553, and may be implemented using wire or cable, fiber optics, a phone line, a cellular phone link, an radio frequency (RF) link, and/or other communication channels.

In one implementation in a mobile wireless device such as a mobile phone, the system 500 further includes an image capture device such as a camera 520. The system 500 may further include application modules as MMS module 521, SMS module 522, email module 523, social network interface (SNI) module 524, audio/video (AV) player 525, web browser 526, image capture module 527, etc.

The system 500 further includes a d a voice recognition vocabulary application integration module 530 as described herein, according to an embodiment. In one implementation of voice recognition vocabulary application integration module 530 along with an operating system 529 may be implemented as executable code residing in a memory of the system 500. In another embodiment, such modules are in firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though embodiments have been described with reference to certain versions thereof; however, other versions are possible. Therefore, the spirit and scope of the appended claims should not be limited to the description of the preferred versions contained herein.

What is claimed is:

1. A method for vocabulary integration in speech recognition, comprising:
   converting a plurality of speech signals into a plurality of words using a processor;
   applying a plurality of confidence scores to the plurality of words;
   receiving classification criteria for a primary application;
   classifying the plurality of words into a plurality of classifications to identify a vocabulary application group that the plurality of words belongs to by performing a first classification process based on using the classification criteria for the primary application and the confidence score for each one of the plurality of words;
   determining one or more unrecognized words of the plurality of words based on the plurality of classifications;
   receiving additional classification criteria for multiple secondary vocabulary applications for the one or more unrecognized words, wherein the multiple secondary vocabulary applications comprise application specific vocabularies;
   classifying each of the one or more unrecognized words to identify a vocabulary application group that the one or more unrecognized words belong to by performing a second classification process based on using the received additional classification criteria and confidence scores determined for the one or more unrecognized words;
   detecting a match for each of the one or more unrecognized words based on the classifying each of the one or more unrecognized words with the received additional classification criteria; and
   upon detecting a match for an unrecognized word, converting at least a portion of the plurality of speech signals corresponding to the unrecognized word into a plurality of recognized words.

2. The method of claim 1, further comprising:
   receiving the plurality of speech signals using an electronic device, wherein a primary vocabulary application is used for converting the plurality of speech signals into the plurality of words; and
   receiving the additional classification criteria for the multiple secondary vocabulary applications for the one or more unrecognized words, wherein the multiple application specific vocabularies include application specific terms that are integrated with terms from the primary vocabulary application into an automatic speech recognition (ASR) engine.

3. The method of claim 2, wherein the primary vocabulary application is a generic vocabulary application, and the multiple secondary vocabulary applications are third-party provided vocabulary applications, and each of the third-party provided vocabulary applications comprise vocabulary that is specific to a third-party provider.

4. The method of claim 3, wherein classifying the plurality of words and classifying the one or more unrecognized words using the first classification process and the second classification process are based on using a classifier comprising at least one of binary classification, use of feature vectors, linear classification and non-linear classification.

5. The method of claim 4, further comprising:
   converting all of the plurality of speech signals to words using the specific one of the multiple secondary vocabulary applications.

6. The method of claim 5, further comprising:
using a natural language understanding process for recognizing the converted words.

7. The method of claim 6, wherein the third-party vocabulary applications comprise one or more vocabulary lists.

8. The method of claim 7, wherein the one or more vocabulary lists are provided one at a time for subsequent speech recognition processes.

9. The method of claim 2, wherein converting the plurality of speech signals to words based on using the primary vocabulary application comprises a first speech recognition process; and converting at least the portion of the plurality of speech signals to words using the specific one of the multiple secondary vocabulary applications comprises a second speech recognition process.

10. The method of claim 9, wherein the first speech recognition process and the second speech recognition process are both performed together, and a result of the first speech recognition process and a result of the second speech recognition process combine to provide a recognized speech result.

11. The method of claim 1, wherein the application specific vocabularies comprise made-up words.

12. The method of claim 1, further comprising:
requesting the multiple secondary vocabularies that are limited to one or more application specific vocabularies that are classified as having a possible match for the one or more unrecognized words.

13. A system for vocabulary integration of speech recognition, comprising:
an electronic device including a microphone configured to receive a plurality of speech signals; and
an automatic speech recognition (ASR) engine configured to convert the plurality of speech signals into a plurality of words, the ASR engine comprising:
a vocabulary application interface configured to integrate multiple vocabulary applications; and
a classifier configured to provide classification for a primary vocabulary application to identify a vocabulary application group that the plurality of words belongs to by performing a first classification process based on using classification criteria and confidence scores determined for the plurality of words, and to provide classification for one or more unrecognized words to identify a vocabulary application group that the one or more unrecognized words belongs to by performing a second classification process based on additional classification criteria for multiple secondary vocabulary applications and confidence scores determined for the one or more unrecognized words, wherein the multiple secondary vocabulary applications comprise application specific vocabularies,
and a plurality of unrecognized words resulting from a first speech recognition pass using the ASR engine are converted into a plurality of recognized words using the ASR engine for a second speech recognition pass for providing a recognized speech result.

14. The system of claim 13, wherein the ASR engine is configured to convert the plurality of speech signals into the plurality of words based on using the primary vocabulary application and the multiple secondary vocabulary applications.

15. The system of claim 14, wherein the primary vocabulary application is a generic vocabulary application, and the multiple secondary vocabulary applications are third-party provided vocabulary applications, the first speech recognition pass is based on the primary vocabulary application and the second speech recognition pass is based on the multiple secondary vocabulary applications, and each of the third-party provided vocabulary applications comprise vocabulary that is specific to a third-party provider.

16. The system of claim 15, wherein the classifier is configured to classify recognized and unrecognized words using the first classification process and the second classification process based on employing a processor for performing at least one of binary classification, use of feature vectors, linear classification and non-linear classification.

17. The system of claim 15, wherein the third-party vocabulary applications comprise one or more vocabulary lists, and a third-party application comprising multiple vocabulary lists provides each vocabulary list one at a time for subsequent speech recognition processes.

18. The system of claim 15, wherein the electronic device is a mobile phone.

19. The system of claim 13, wherein the application specific vocabularies comprise made-up words.

20. A non-transitory computer-readable medium having instructions which when executed on a computer perform a method comprising:
performing a first speech recognition process for converting a plurality of speech signals into a plurality of words;
receiving classification criteria for a primary application;
classifying the plurality of words to identify a vocabulary application group that the plurality of words belongs to by performing a first classification process based on using a confidence score for each one of the plurality of words and the classification criteria;
upon determining that one or more words are unrecognized based on the classifying, receiving additional classification criteria for one or more unrecognized words for multiple secondary vocabulary applications, wherein the multiple secondary vocabulary applications comprise application specific vocabularies;
classifying the one or more unrecognized words to identify a vocabulary application group that the one or more unrecognized words belong to by performing a second classification process based on using a plurality of confidence scores for each unrecognized word and the additional received classification criteria; and
upon determining a match for the one or more unrecognized words, performing a second speech recognition process for converting at least a portion of the plurality of speech signals to a plurality of recognized words.

21. The medium of claim 20, further comprising:
receiving the plurality of speech signals using an electronic device, wherein a primary vocabulary application is used for converting the plurality of speech signals into the plurality of words; and
receiving the additional classification criteria for multiple secondary vocabulary applications for the one or more unrecognized words.

22. The medium of claim 21, wherein the primary vocabulary application is a generic vocabulary application, and the multiple secondary vocabulary application are third-party provided vocabulary applications.

23. The medium of claim 22, wherein each of the third-party provided vocabulary applications comprise vocabulary that is specific to a third-party provider.

24. The medium of claim 23, wherein classifying the plurality of words and classifying the one or more unrecognized words using the first classification process and the second classification process are based on using a classifier comprising at least one of binary classification, use of feature vectors, linear classification and non-linear classification.

25. The medium of claim 24, further comprising: converting each of the plurality of speech signals to the plurality of words using a specific secondary vocabulary application.

26. The medium of claim 25, further comprising:
using a natural language understanding process for recognizing the converted words.

27. The medium of claim 25, wherein the third-party vocabulary applications comprise one or more vocabulary lists.

28. The medium of claim 27, wherein the one or more vocabulary lists are provided one at a time for subsequent speech recognition processes.

29. The medium of claim 28, wherein a result of the first speech recognition process and the second speech recognition process combine to provide a recognized speech result.

30. The medium of claim 21, wherein the multiple secondary vocabulary applications are provided over a network, and the application specific vocabularies comprise made-up words.

* * * * *